United States Patent
No et al.

(10) Patent No.: US 10,138,958 B2
(45) Date of Patent: Nov. 27, 2018

(54) METHOD OF LEARNING TOUCH POINT OF CLUTCH

(71) Applicant: Hyundai Autron Co., Ltd., Seongnam-si (KR)

(72) Inventors: Jin-Won No, Seongnam-si (KR); Min-Hyo Kim, Gunpo-si (KR)

(73) Assignee: Hyundai Autron Co., Ltd., Gyeonggi-do (KR)

( * ) Notice: Subject to any disclaimer, the term of this patent is extended or adjusted under 35 U.S.C. 154(b) by 85 days.

(21) Appl. No.: 15/353,539

(22) Filed: Nov. 16, 2016

(65) Prior Publication Data
US 2017/0146078 A1    May 25, 2017

(30) Foreign Application Priority Data
Nov. 20, 2015 (KR) .................. 10-2015-0162968

(51) Int. Cl.
*F16D 48/08* (2006.01)
*F16D 48/06* (2006.01)

(52) U.S. Cl.
CPC ............ *F16D 48/08* (2013.01); *F16D 48/06* (2013.01); *F16D 2500/10406* (2013.01); *F16D 2500/10412* (2013.01); *F16D 2500/3026* (2013.01); *F16D 2500/3067* (2013.01); *F16D 2500/30406* (2013.01); *F16D 2500/30415* (2013.01);
(Continued)

(58) Field of Classification Search
CPC .............. F16D 48/06; F16D 48/08; F16D 2500/10406; F16D 2500/10412; F16D 2500/30405; F16D 2500/30415; F16D 2500/30426; F16D 2500/3067; F16D 2500/50245; F16D 2500/50251; F16D 2500/5026; F16D 2500/70605
See application file for complete search history.

(56) References Cited

U.S. PATENT DOCUMENTS 6,658,341 B2 * 12/2003 Inoue ................. F16D 48/06
                                                      192/48.6
7,025,708 B2 *  4/2006 Rieger ................ F16D 48/06
                                                       477/171
(Continued)

FOREIGN PATENT DOCUMENTS

DE    102013201317 A1 *  8/2013 ............ F16D 48/06
KR    10-2014-0060013 A     5/2014
(Continued)

*Primary Examiner* — Ramya P Burgess
*Assistant Examiner* — David R Morris
(74) *Attorney, Agent, or Firm* — Morgan, Lewis & Bockius LLP

(57) ABSTRACT

A method for learning a touch point of a clutch may include a step of outputting a first control signal for controlling a touch point learning mode to be entered if a preset condition is satisfied, a step of calculating a reference value by dividing a difference value between rotational speed of a drive shaft clutch and rotational speed of a non-drive shaft clutch by a difference value between rotational speed of an engine and the rotational speed of the drive shaft clutch, a step of outputting a second control signal for moving the non-drive shaft clutch toward the engine if the reference value is less than a preset threshold value and a step of determining a position of the non-drive shaft clutch at a time when the reference value reaches the preset threshold value to be the touch point.

2 Claims, 3 Drawing Sheets

(52) U.S. Cl.
CPC .............. *F16D 2500/30426* (2013.01); *F16D 2500/50245* (2013.01); *F16D 2500/50275* (2013.01); *F16D 2500/70264* (2013.01); *F16D 2500/70605* (2013.01)

(56) References Cited

U.S. PATENT DOCUMENTS

| | | | | |
|---|---|---|---|---|
| 8,052,579 | B2* | 11/2011 | Eich | F16D 48/06 477/175 |
| 8,972,134 | B2* | 3/2015 | Yoon | F16D 48/06 701/67 |
| 9,744,842 | B2* | 8/2017 | Kim | B60K 6/387 |
| 9,822,831 | B2* | 11/2017 | Cho | F16H 61/688 |
| 2002/0183912 | A1* | 12/2002 | Inoue | F16D 48/06 701/67 |
| 2004/0147367 | A1* | 7/2004 | Rieger | F16D 48/06 477/176 |
| 2008/0305931 | A1* | 12/2008 | Eich | F16D 48/06 477/174 |
| 2014/0136065 | A1* | 5/2014 | Yoon | F16D 48/06 701/68 |
| 2017/0030421 | A1* | 2/2017 | Kim | F16D 48/06 |
| 2017/0082156 | A1* | 3/2017 | Kim | F16D 48/06 |
| 2017/0138421 | A1* | 5/2017 | Cho | F16D 48/08 |

FOREIGN PATENT DOCUMENTS

| | | |
|---|---|---|
| KR | 10-2014-0121947 A | 10/2014 |
| KR | 10-2015-0011482 A | 2/2015 |
| KR | 10-1704289 B1 | 2/2017 |

\* cited by examiner

METHOD OF LEARNING TOUCH POINT OF CLUTCH

This application claims the benefit of Korean Patent Application No. 10-2015-0162968, filed on Nov. 20, 2015, in the Korean Intellectual Property Office, the disclosure of which is incorporated herein by reference in its entirety.

BACKGROUND

Field

The present inventive concept relates to a method of learning a touch point of a clutch, and more particularly, to a method of learning a touch point of a clutch, in which a touch point learning mode is entered based on judgment about the state of clutches and a touch point is determined based on the rotational speeds of a drive shaft clutch, a non-drive shaft clutch and an engine.

Description of the Related Art

A dual-clutch transmission (DCT) is an automatic transmission including two clutches. It is a clutch system that selectively transmits torque received from an engine to two input shafts using two clutches. Since gears are disposed on the two input shafts, power corresponding to a gear ratio is transmitted to wheels.

Here, each of the clutches transmits the torque of the engine to the wheels by switching, stage by stage, from a clutch open state in which the clutch is physically separated from the engine to a slip state in which the clutch begins to have friction and thus a difference in speed between both ends of the clutch becomes equal to or greater than a predetermined value and then to a lockup state in which there is no difference in speed between both ends of the clutch and the torque of the engine transmitted to the input shaft of the clutch is transmitted to an output shaft connected to the wheels. When the clutch is separated from the engine, the above process is performed in the reverse order.

A touch point is a position at which a clutch slips, that is, a position at which the clutch begins to receive power from an engine. The touch point may vary according to temperature change or abrasion. Therefore, for stable operation of the clutch, it is important to learn the position of the touch point in advance.

Accordingly, there is a need for a new form of touch point learning method which makes it possible to reduce a clutch control error by accurately learning a touch point.

SUMMARY

Aspects of the inventive concept provide a method of learning a touch point of a clutch, the method being employed to significantly reduce a control error.

Aspects of the inventive concept also provide a method of learning a touch point, the method being employed to learn a touch point even while a vehicle is being driven.

However, aspects of the inventive concept are not restricted to the one set forth herein. The above and other aspects of the inventive concept will become more apparent to one of ordinary skill in the art to which the inventive concept pertains by referencing the detailed description of the inventive concept given below.

According to an aspect of the inventive concept, there is provided a method of learning a touch point of a clutch, the method comprises outputting a first control signal for controlling a touch point learning mode to be entered if a preset condition is satisfied, calculating a reference value by dividing a difference value between rotational speed of a drive shaft clutch and rotational speed of a non-drive shaft clutch by a difference value between rotational speed of an engine and the rotational speed of the drive shaft clutch, outputting a second control signal for moving the non-drive shaft clutch toward the engine if the reference value is less than a preset threshold value and determining a position of the non-drive shaft clutch at a time when the reference value reaches the preset threshold value to be the touch point.

According to another aspect of the inventive concept, there is provided an apparatus for learning a touch point, the apparatus comprises a judgment unit which outputs a first control signal for controlling a touch point learning mode to be entered if a preset condition is satisfied, a reference value calculation unit which calculates a reference value by dividing a difference value between rotational speed of a drive shaft clutch and rotational speed of a non-drive shaft clutch by a difference value between rotational speed of an engine and the rotational speed of the drive shaft clutch, a clutch control unit which outputs a second control signal for moving the non-drive shaft clutch toward the engine if the reference value is less than a preset threshold value and a touch point determination unit which determines a position of the non-drive shaft clutch at a time when the reference value reaches the preset threshold value to be the touch point.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
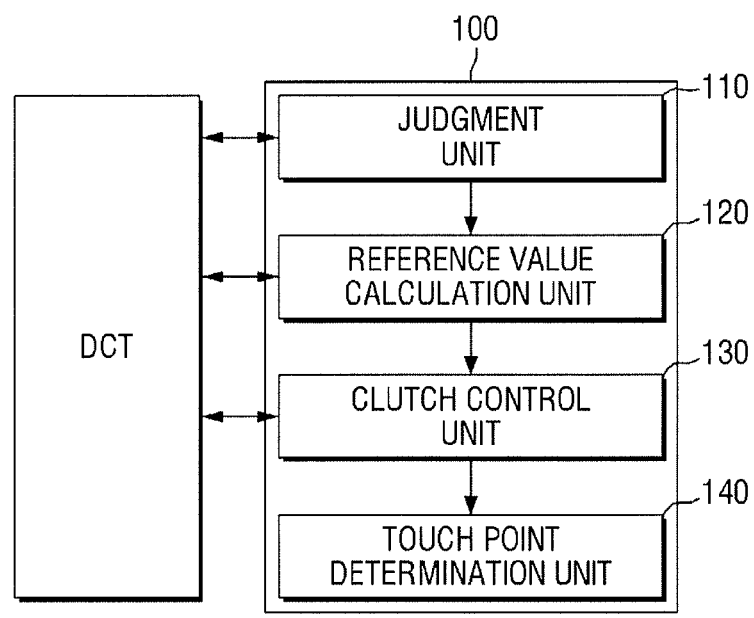
FIG. 1 is a functional block diagram of an apparatus for learning a touch point according to an embodiment.

The present inventive concept will now be described more fully with reference to the accompanying drawings, in which exemplary embodiments of the inventive concept are shown. Advantages and features of the inventive concept and methods of accomplishing the same may be understood more readily by reference to the following detailed description of exemplary embodiments and the accompanying drawings. The inventive concept may, however, be embodied in many different forms and should not be construed as being limited to the embodiments set forth herein. Rather, these embodiments are provided so that this disclosure will be thorough and complete and will fully convey the concept of the invention to those skilled in the art, and the inventive concept will only be defined by the appended claims. Like reference numerals refer to like elements throughout the specification.

Unless otherwise defined, all terms (including technical and scientific terms) used herein have the same meaning as commonly understood by one of ordinary skill in the art to which the inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the singular forms "a", "an" and "the" are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, elements, and/or groups thereof.

FIG. 1 is a functional block diagram of an apparatus 100 for learning a touch point according to an embodiment.

Referring to FIG. 1, the apparatus 100 for learning a touch point includes a judgment unit 110, a reference value calculation unit 120, a clutch control unit 130, and a touch point determination unit 140. In FIG. 1, elements related only to the current embodiment are illustrated. Therefore, it can be understood by those of ordinary skill in the art to which the inventive concept pertains that other general-purpose elements can be included in addition to the elements illustrated in FIG. 1.

In addition, in the current embodiment, the judgment unit 110, the reference value calculation unit 120, the clutch control unit 130, and the touch point determination unit 140 are illustrated as separate elements. However, their functions can also be performed by one element, for example, an electronic control unit (ECU).

The judgment unit 110 outputs a first control signal for controlling a touch point learning mode to be entered when a preset condition is satisfied. Here, the preset condition may be that a drive shaft clutch is in a slip state and a non-drive shaft clutch is in an open state.

A dual-clutch transmission (DCT) transmits power generated by an engine to wheels using two clutches. When a clutch receives power from the engine, the other clutch maintains a clutch open state in which it is physically separated from the engine.

Here, the clutch which is connected to the engine to receive power from the engine is a drive shaft clutch, and the clutch which maintains the clutch open state in which it is physically separated from the engine is a non-drive shaft clutch.

If the drive shaft clutch is in the slip state in which it begins to have friction with the engine and if the non-drive shaft clutch is in the open state, the judgment unit 110 according to the embodiment judges that the preset condition has been satisfied. Therefore, the judgment unit 110 outputs the first control signal for controlling the touch point learning mode to be entered.

The reference value calculation unit 120 calculates a reference value by dividing a difference value between the rotational speed of the drive shaft clutch and the rotational speed of the non-drive shaft clutch by a difference value between the rotational speed of the engine and the rotational speed of the drive shaft clutch.

Once the touch point learning mode is entered, it means that the preset condition has been satisfied and that the drive shaft clutch maintains the slip state according to the preset condition. Therefore, the drive shaft clutch is rotated at certain speed by some power received from the engine.

In addition, although the non-drive shaft clutch does not receive power from the engine, it may be rotated at certain speed by the effect of, e.g., inertia. Therefore, the reference value calculation unit 120 according to the embodiment calculates the reference value using the following equation.

$$\text{Reference value} = |\text{Rotational speed of drive shaft clutch} - \text{Rotational speed of non-drive shaft clutch}| / |\text{Rotational speed of speed of engine} - \text{Rotational speed of drive shaft clutch}|$$

If the reference value is less than a preset threshold value, the clutch control unit 130 outputs a second control signal for moving the non-drive shaft clutch toward the engine.

When the non-drive shaft clutch is moved toward the engine by the second control signal, the power generated by the engine is slowly transmitted to the non-drive shaft clutch. Accordingly, the rotational speed of the non-drive shaft clutch increases, thereby increasing the reference value if the rotational speed of the non-drive shaft clutch is higher than the rotational speed of the driving shaft clutch.

For example, assuming that the rotational speed of the engine is 2000 RPM, the drive-shaft clutch, being in the slip state, may rotate at a lower speed of 500 RPM, and the non-drive shaft clutch may rotate at 200 RPM due to inertia. In this case, the reference value is (500-200)/(2000-500) =0.2 according to the above equation.

As the non-drive shaft is gradually moved toward the engine by the clutch control unit 130, it switches from the clutch open state to the slip state. Therefore, the power generated by the engine is transmitted to the non-drive shaft clutch. If the rotational speed of the non-drive shaft gradually increases as the non-drive shaft moves toward engine, the reference value also increases.

The touch point determination unit 140 determines the position of the non-drive shaft clutch at a time when the reference value reaches the preset threshold value to be a touch point.

As described above, as the non-drive shaft clutch moves toward the engine, the reference value increases. This is because the power generated by the engine is transmitted to the non-drive shaft clutch as the non-drive shaft moves toward the engine.

Accordingly, the touch point determination unit 140 according to the embodiment may determine the position of the non-drive shaft clutch at a time when the reference value reaches the preset threshold value to be a touch point at which the non-drive shaft clutch begins to have friction with the engine.

If the touch point of the clutch is determined in the above way, the touch point can be learned even while a vehicle is being driven. That is, since the touch point is determined by gradually moving the non-drive shaft clutch which does not transmit power generated by the engine, the touch point can be determined even while the drive shaft clutch is transmitting power.

In addition, since the touch point is determined when the drive shaft clutch is in the slip state, a control error can be removed.

Figure 2:
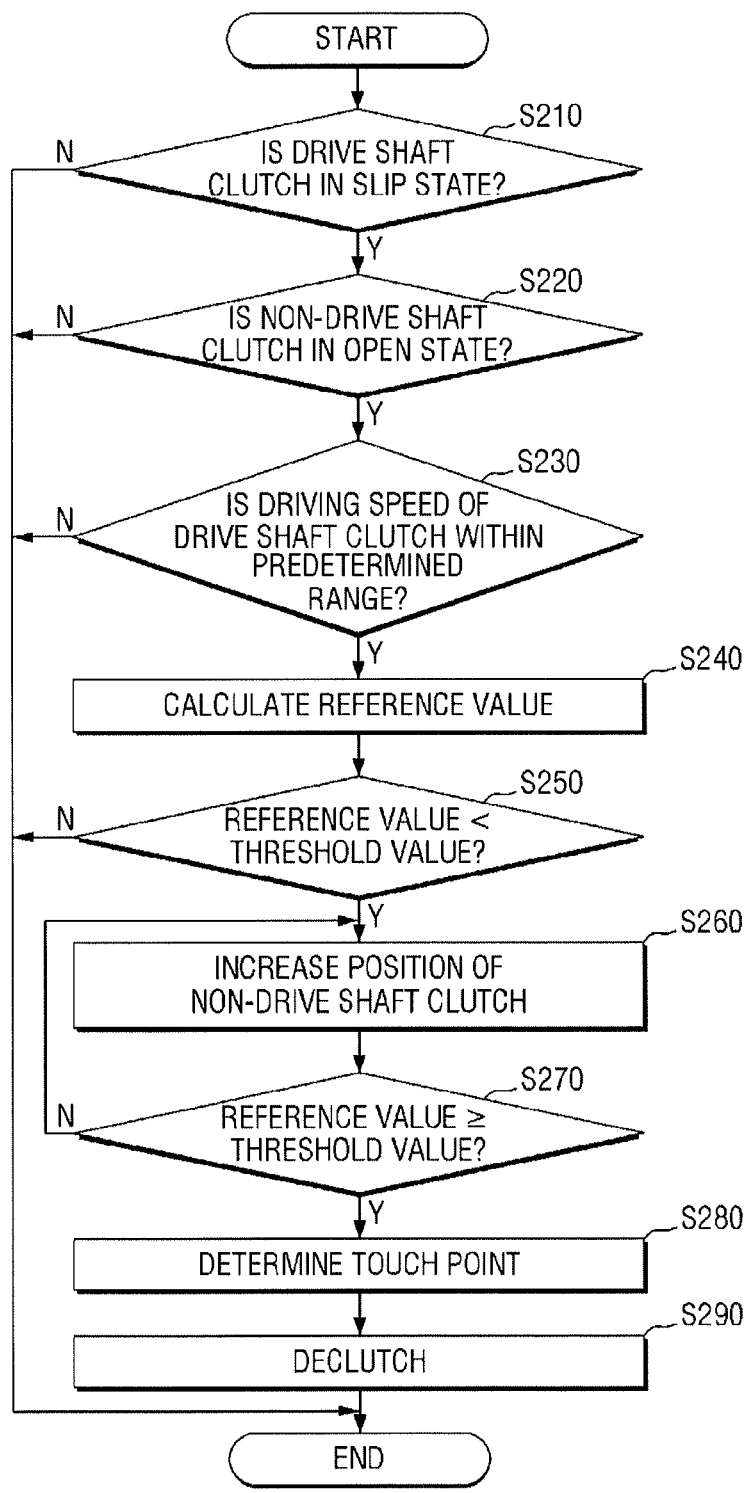
FIG. 2 is a flowchart illustrating a method of learning a touch point of a clutch according to an embodiment.

FIG. 2 is a flowchart illustrating a method of learning a touch point of a clutch according to an embodiment.

Only when a preset condition is satisfied can a touch point learning mode be entered according to an embodiment. Therefore, the judgment unit 110 judges whether a drive shaft clutch is in a slip state (operation S210) and a non-drive shaft clutch is in an open state (operation S220) according to the preset condition.

Additionally, the judgment unit 110 according to the embodiment may judge whether the rotational speed of the drive shaft clutch is within a predetermined range (operation S230). When the rotational speed of the drive shaft clutch is too high or too low, an accurate touch point cannot be determined, resulting in an error.

If the above condition is satisfied, the reference value calculation unit 120 calculates a reference value by dividing a difference value between the rotational speed of the drive shaft clutch and the rotational speed of the non-drive shaft clutch by a difference value between the rotational speed of an engine and the rotational speed of the drive shaft clutch (operation S240).

Then, if the reference value is less than a preset threshold value (operation S250), the clutch control unit 130 increases the position of the non-drive shaft clutch (operation S260). Here, increasing the position of the non-drive shaft clutch is to move the non-drive shaft clutch toward the engine.

As the position of the non-drive shaft increases, the rotational speed of the non-drive shaft clutch increases. Accordingly, the reference value also increases.

When the reference value reaches the preset threshold value, the touch point determination unit 140 determines that the non-drive shaft clutch has reached a touch point at which the non-drive shaft clutch begins to receive power from the engine. Therefore, the touch point determination unit 140 determines the position of the non-drive shaft clutch at the time when the reference value reaches the preset threshold value to be the touch point (operation S280).

Once the touch point is determined, the non-drive shaft clutch is declutched in order to prevent an interlock due to the lockup of the non-drive shaft clutch (operation S290).

Here, the lockup denotes a state in which the non-drive shaft clutch is completely coupled to the engine and thus receives power from the engine, and the interlock denotes a state in which two clutches are simultaneously coupled to the engine.

Figure 3:
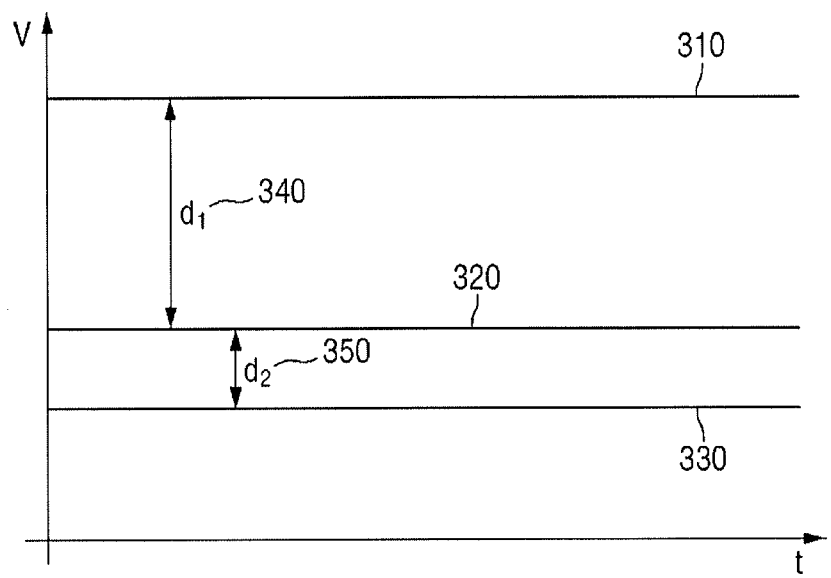
FIG. 3 illustrates the rotational speeds of an engine, a drive shaft clutch and a non-drive shaft clutch according to an embodiment.

FIG. 3 illustrates the rotational speeds of an engine, a drive shaft clutch and a non-drive shaft clutch according to an embodiment.

In FIG. 3, the rotational speeds of the engine, the drive shaft clutch and the non-drive shaft clutch over time are illustrated. In addition, the drive shaft clutch maintains a slip state, and the non-drive shaft clutch maintains an open state.

Since the drive shaft clutch is in the slip state, it fails to fully receive power generated by the engine. Therefore, rotational speed 320 of the drive shaft clutch is lower than rotational speed 310 of the engine.

Since the non-drive shaft clutch is in the open state, it cannot receive power from the engine. However, the non-drive shaft clutch may have certain speed due to, e.g., inertia. Therefore, rotational speed 330 of the non-drive shaft clutch may be lower than the rotational speed 320 of the drive shaft clutch.

Here, d1 340 indicates a difference between the rotational speed 310 of the engine and the rotational speed 320 of the drive shaft clutch, and d2 350 indicates a difference between the rotational speed 320 of the drive shaft clutch and the rotational speed 330 of the non-drive shaft clutch. The differences d1 340 and d2 350 are used to calculate a reference value according to an embodiment.

If the rotational speeds of the engine, the drive shaft clutch and the non-drive shaft clutch illustrated in FIG. 3 satisfy a preset condition according to an embodiment, a touch point learning mode is entered.

Specifically, if the rotational speed 320 of the drive shaft clutch is within a predetermined range, the touch point learning mode is entered.

Figure 4:
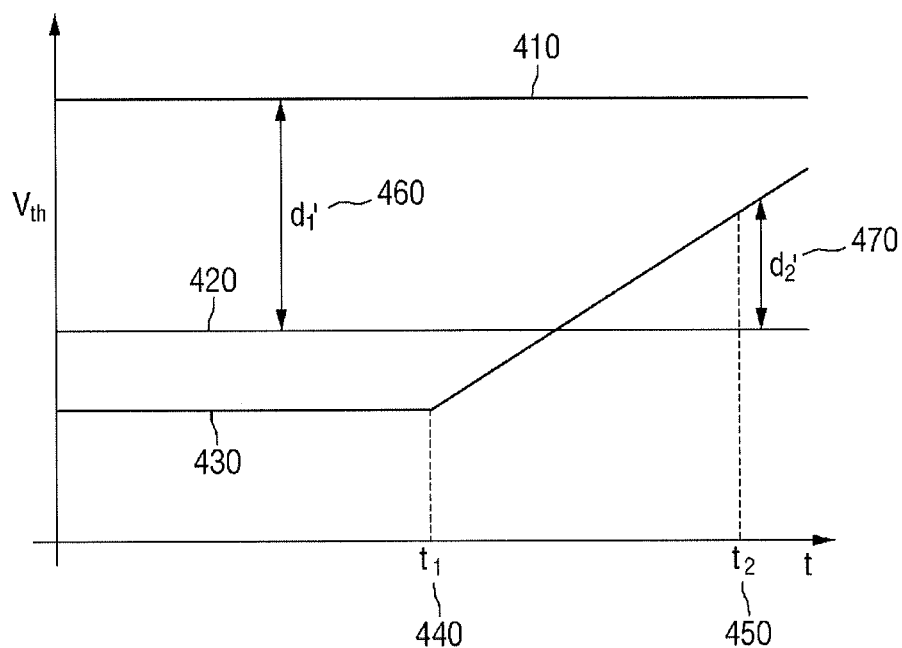
FIG. 4 illustrates the change in the rotational speeds of an engine, a drive shaft clutch and a non-drive shaft clutch in a case where a touch point learning mode is entered according to an embodiment.

FIG. 4 illustrates the change in the rotational speeds of an engine, a drive shaft clutch and a non-drive shaft clutch in a case where a touch point learning mode is entered according to an embodiment.

In FIG. 4, t1 440 indicates a time when the clutch control unit 130 started to move the non-drive shaft clutch toward the engine. As the non-drive shaft clutch becomes closer to the engine, it receives power from the engine. Therefore, rotational speed 430 of the non-drive shaft clutch increases gradually.

As the driving speed 430 of the non-drive shaft clutch increases, a value of d2' 470 increases gradually. In Equation (1) above, d2' 470 is a numerator. Since d2' 470 increases while d1' 460 remains unchanged, a reference value increases.

When the reference value reaches a preset threshold value, the touch point determination unit 170 according to the embodiment may determine the position of the non-drive shaft clutch at that time to be a touch point.

Therefore, the touch point can be determined even while a vehicle is being driven, and a control error can be reduced because an accurate touch point can be determined.

According to a method of learning a touch point according to an embodiment, a touch point can be learned even while a vehicle is being driven.

In addition, since a touch point is determined when a drive shaft clutch is in a slip state, a control error can be reduced.

While the inventive concept has been particularly shown and described with reference to exemplary embodiments thereof, it will be understood by those of ordinary skill in the art that various changes in form and detail may be made therein without departing from the spirit and scope of the inventive concept as defined by the following claims. The exemplary embodiments should be considered in a descriptive sense only and not for purposes of limitation. Therefore, the scope of the inventive concept is defined not by the detailed description of the inventive concept but by the following claims, and all differences within the scope will be construed as being included in the inventive concept.

What is claimed is:

1. A method of learning a touch point, the method comprising:

Outputting, by a controller, a first control signal for controlling a touch point learning mode to be entered when a preset condition is satisfied;

calculating, by the controller, a reference value by dividing a difference value between rotational speed of a drive shaft clutch and rotational speed of a non-drive shaft clutch by a difference value between driving speed of an engine and the driving speed of the drive shaft clutch;

outputting, by the controller, a second control signal for moving by an actuator the non-drive shaft clutch toward the engine if the reference value is less than a preset threshold value;

determining, by the controller, a position of the non-drive shaft clutch to be the touch point at a time when the reference value reaches the preset threshold value; and declutching, by a signal of the controller, the non-drive clutch for the non-drive clutch when the touch point is determined, wherein the outputting the first control signal for controlling the touch point learning mode to be entered when the preset condition is satisfied comprises entering the touch point learning mode if the drive shaft clutch is in a slip state and the non-drive shaft clutch is an open state.

2. The method of claim 1, wherein the entering the touch point learning mode comprises entering the touch point learning mode when the driving speed of the drive shaft clutch is within a predetermined range.

* * * * *